US010938655B2

(12) United States Patent
Murthy et al.

(10) Patent No.: US 10,938,655 B2
(45) Date of Patent: Mar. 2, 2021

(54) ENTERPRISE CLOUD GARBAGE COLLECTOR

(71) Applicant: International Business Machines Corporation, Armonk, NY (US)

(72) Inventors: Karin Murthy, Danbury, CT (US); Zhiming Shen, Ithaca, NY (US); Christopher Charles Young, Sleepy Hollow, NY (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 15/006,571

(22) Filed: Jan. 26, 2016

(65) Prior Publication Data

US 2017/0214588 A1 Jul. 27, 2017

(51) Int. Cl.
*H04L 12/24* (2006.01)
*H04L 12/26* (2006.01)

(52) U.S. Cl.
CPC ...... *H04L 41/0823* (2013.01); *H04L 41/0883* (2013.01); *H04L 43/0876* (2013.01); *H04L 41/142* (2013.01); *H04L 41/16* (2013.01)

(58) Field of Classification Search
CPC ....... H04L 47/70; H04L 47/823; H04L 47/15; H04L 47/801; H04L 47/822; H04L 29/06; H04L 12/1818; H04L 12/1827; H04L 29/06027; H04L 41/142; H04L 41/147; H04L 47/806; H04L 47/826; H04L 65/4038; G06Q 10/06; G06Q 30/02; G06Q 50/34; G06Q 10/10; G06Q 10/00; G06Q 10/04; G07F 17/3258; G07F 17/3288; G07F 17/34; G07F 17/32; G07F 17/323
See application file for complete search history.

(56) References Cited

U.S. PATENT DOCUMENTS

2015/0339197 A1* 11/2015 Kavuri .................. G06F 3/0647 707/645
2016/0209844 A1* 7/2016 Lombrozo ............ B60W 40/00
2016/0269313 A1* 9/2016 Brooker ................ G06F 9/5072
2017/0126500 A1* 5/2017 Eggen ................. H04L 41/0823

* cited by examiner

*Primary Examiner* — Chris Parry
*Assistant Examiner* — Abderrahmen Chouat
(74) *Attorney, Agent, or Firm* — Fleit Intellectual Property Law; Donna Flores

(57) ABSTRACT

Various embodiments collect unproductive resources in a network infrastructure. In one embodiment, data relating to resources of a network infrastructure is collected. An analytics model is selected based on a type of the collected data. The selected analytics model is executed to classify a resource unproductive or productive, and to assign a corresponding confidence level. An action plan for each confidence level is determined and the action plan is executed for the resource. The collected data may include resource utilization information, hypervisor information, cloud related meta-data, user knowledge and system knowledge. When data is only resource data, a resource mining model is selected. When the data includes reference data, a reference mining model is selected. When the data comprises reference data and resource data, a combined mining model is selected.

20 Claims, 14 Drawing Sheets

ENTERPRISE CLOUD GARBAGE COLLECTOR

BACKGROUND

The present disclosure generally relates to cloud garbage collecting, and more particularly relates to a system to analyze information and identify cloud resources which are or are not in productive use with a high level of confidence.

Virtualization and cloud technologies enable easy, fast, and cheap server or resource provisioning. Yet recent studies estimate that 1 in 3 data center servers is not producing any useful work (i.e. a "zombie"). That inefficiency translates to around 10 million comatose servers worldwide, representing a $30 billion capital investment in data center, not to mention a 40% electrical energy waste (e.g., around $3.8 billion per year in US only). Those cost estimates do not even include hidden costs such as maintenance, software licensing, cooling costs, etc.

Bringing servers or resources back to life generally requires much less time than installing new equipment (e.g., days/months comparing to years). Yet state of the art technologies focus on birth and steady state management of servers and resources, such as resource allocation, resource optimization, etc. This lack of focus on recycling and recollecting the provisioned servers/resources is short-sighted.

Cost is one of the main drivers to avoid overprovisioning and under-utilization of Information Technology (IT) infrastructure. For the cloud provider, unused resources represent significant costs. Unproductive servers and resources continue to incur charges for the capacity occupancy, the IT management functions, the license utilization, etc. Cloud resources are generally easy to create, yet are easily forgotten and as such may still be around even when they are no longer needed. Therefore, a solution for identifying unproductive resources is needed.

BRIEF SUMMARY

In one embodiment, a method for collecting unproductive resources in a network infrastructure is disclosed. The method comprises collecting data relating to resources of a network infrastructure, selecting an analytics model based on a type of the collected data, executing the selected analytics model to classify a resource as one of unproductive and productive and to assign a corresponding confidence level, determining an action plan for each confidence level and executing the action plan for the resource.

In another embodiment, an information processing system for collecting unproductive resources in a network infrastructure is disclosed. The information processing system comprises memory and a processor that is operably coupled to the memory. The information processing system further comprises an enterprise garbage collector operably coupled to the memory and the processor. The enterprise garbage collector is configured to perform a method comprising collecting data relating to resources of a network infrastructure, selecting an analytics model based on a type of the collected data, executing the selected analytics model to classify a resource as one of unproductive and productive and to assign a corresponding confidence level, determining an action plan for each confidence level, and executing the action plan for the resource.

In yet another embodiment, a computer program product for collecting unproductive resources in a network infrastructure is disclosed. The computer program product comprises a storage medium readable by a processing circuit and storing instructions for execution by the processing circuit for performing a method. The method comprises collecting data relating to resources of a network infrastructure, selecting an analytics model based on a type of the collected data, executing the selected analytics model to classify a resource as one of unproductive and productive and to assign a corresponding confidence level, determining an action plan for each confidence level, and executing the action plan for the resource.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
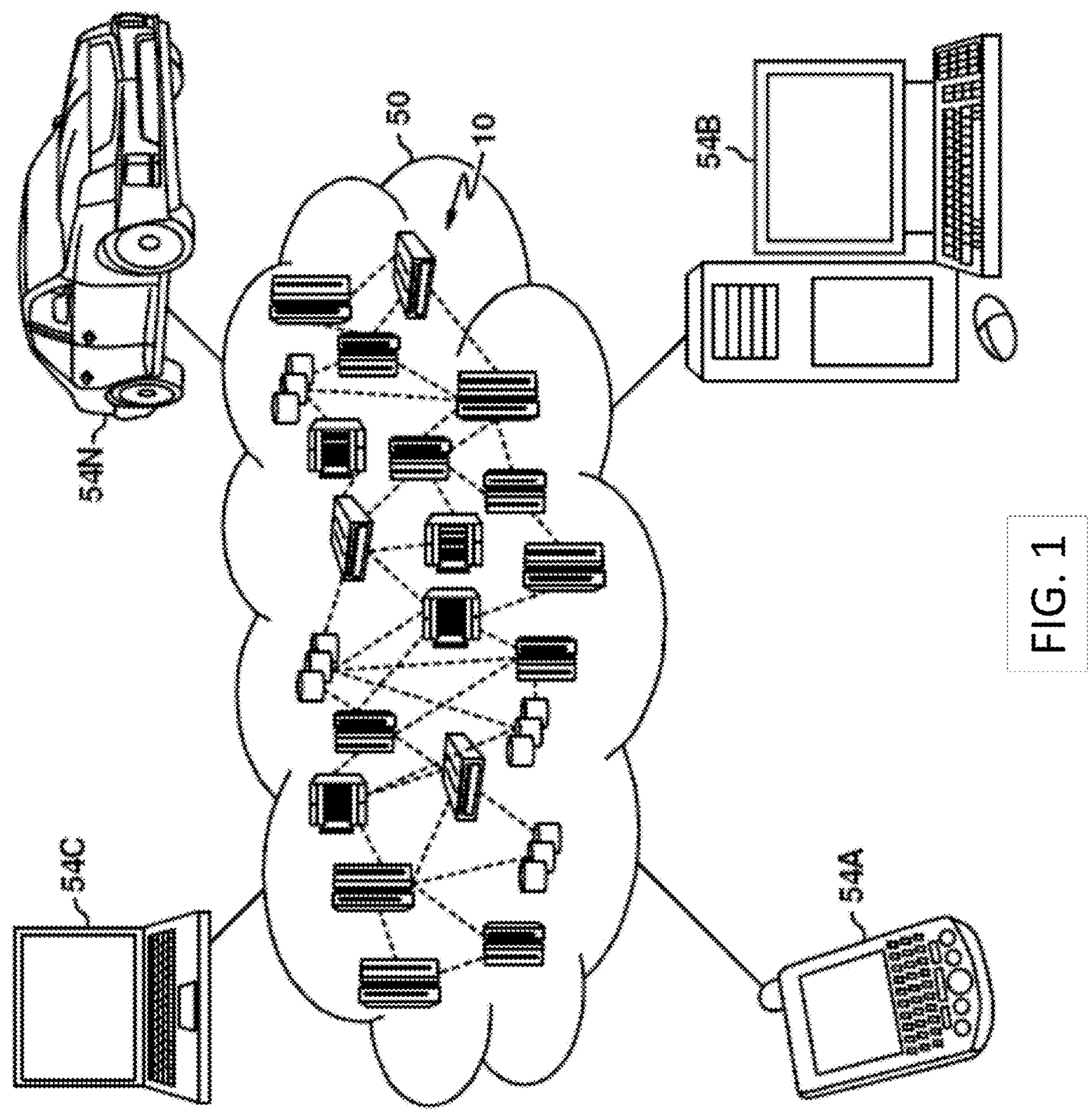
FIG. 1 depicts a cloud computing environment according to an embodiment of the present invention.

In this disclosure, a system and method are presented that discover and collect information about vital cloud resources (such as servers, containers, virtual machines, etc.), to establish relationships between resources providers and consumers. This information is analyzed and cloud resources which are or are not in productive use are identified with a certain level of confidence. Heuristic rules for the system are defined and/or learned based on data collected and human labeling. The system defines, recommends, and executes workflow to perform actions on the cloud resource. Actions may include, for example, notifying the resource owner, determining the resource owner's decision on next actions, putting a resource in hibernation, recollecting the resource, etc.

In the following the term "unproductive resource" is used to denote a resource that is not performing any productive work. An unproductive resource may be idle, inactive, or unused. However, not every idle, inactive, or unused resource is necessarily unproductive (e.g., a disaster recovery server may be idle for a long time but still serves a productive purpose). Also, an active resource may still be unproductive if the resource performs work that nothing depends on.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
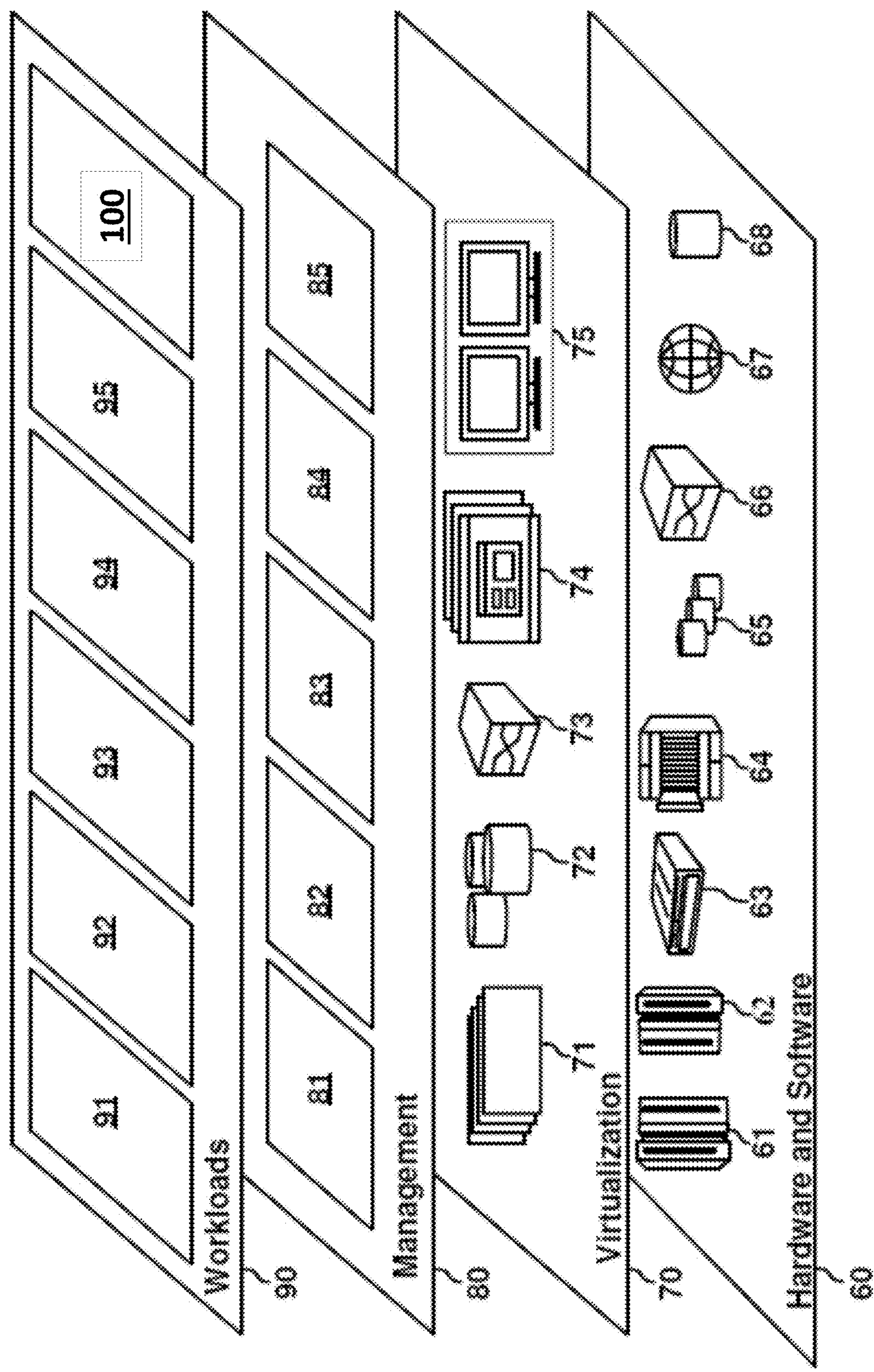
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an enterprise cloud garbage collector 100.

Operating Environment

Figure 3:
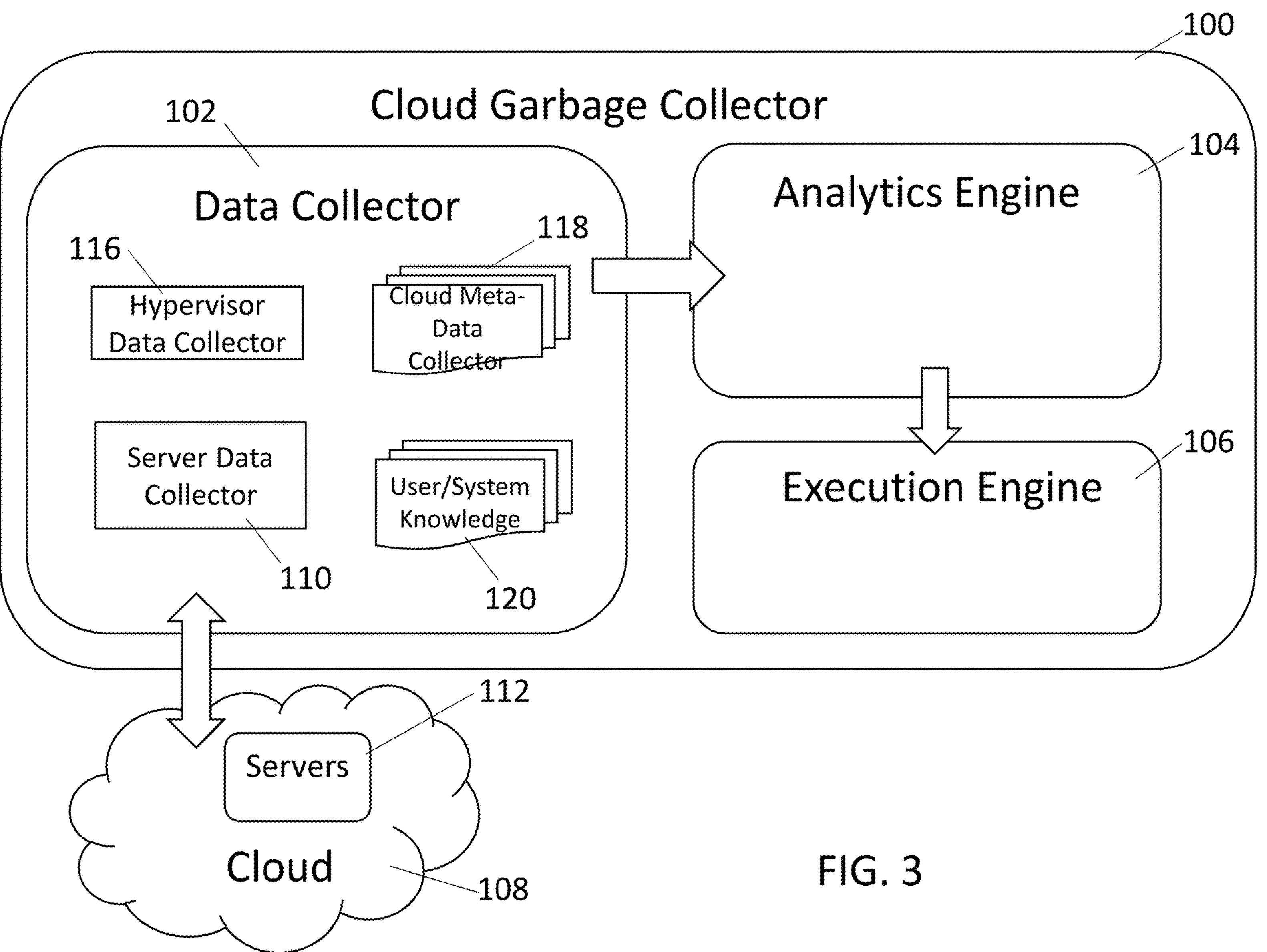
FIG. 3 is a block diagram illustrating one example of an operating environment for an enterprise cloud garbage collector according to one embodiment of the present disclosure.

FIG. 3 shows one example of an operating environment of an enterprise cloud garbage collector 100 for identifying unproductive resources in a cloud computing network of an enterprise or network provider according to one aspect of the present disclosure. The enterprise cloud garbage collector 100 comprises a data collector 102, an analytics engine 104 and an execution engine 106.

The data collector 102 collects information concerning resource usage for resources in a network infrastructure 108 controlled by an enterprise or cloud provider. These resources may include physical servers, virtual machines (VMs), databases, web pages, applications and other similar items. The data collector 102 includes a server data collector 110 which collects application dependencies and resource activity information from all servers 112 in the cloud 108. The information may include network traffic, file system input/output (I/O), login activities, configuration settings, logs, etc. In addition, the network infrastructure 100 may include a hypervisor, and if so, the data collector 102 may include a hypervisor data collector 116 that collects hypervisor information from containers running VMs. The hypervisor information may include the state of the VM, a resource consumption profile, and the like. The data collector 102 also looks at external factors to collect cloud related meta-data 118 such as, for example, whether the resource has a high availability, is used for load balancing or autoscaling, etc. The cloud related meta-data 118 may indicate that a resource is important in some way, even if not currently in use. In other words, even if no one is logging into the resource or the resource is not actively doing anything, the resource may still be important according to various meta-data. The data collector 102 further collects user/system knowledge 120 pertaining to resources, such as whether the resource is used for backup or emergency services. The user/system knowledge 120 may include a change and configuration management database (CCMDB) which shows that the resource may have an important relationship to some other primary resource.

The analytics engine 104 selects an analytics module from one of three analytics models: a resource mining model, a reference mining model and a combined model using elements from both the resource mining model and the reference mining model. The appropriate model is selected based upon the data collected by the data collector 102. The three models are discussed in further detail below. The analytics engine 104 runs the selected model and determines whether a resource is unproductive and assigns a confidence level to the determined results.

The execution engine 106 receives the results from the analytics engine 104 and, based on a set of business rules, determines and executes a corresponding action plan. For example, the execution engine 106 may notify a user and/or enterprise administrator that a resource is unproductive and upon confirmation and approval, decommission the resource, reassign the resource for reuse or consolidation purposes, e.g., move the resource to a lower tier.

Cloud Garbage Collection Method

Figure 4:
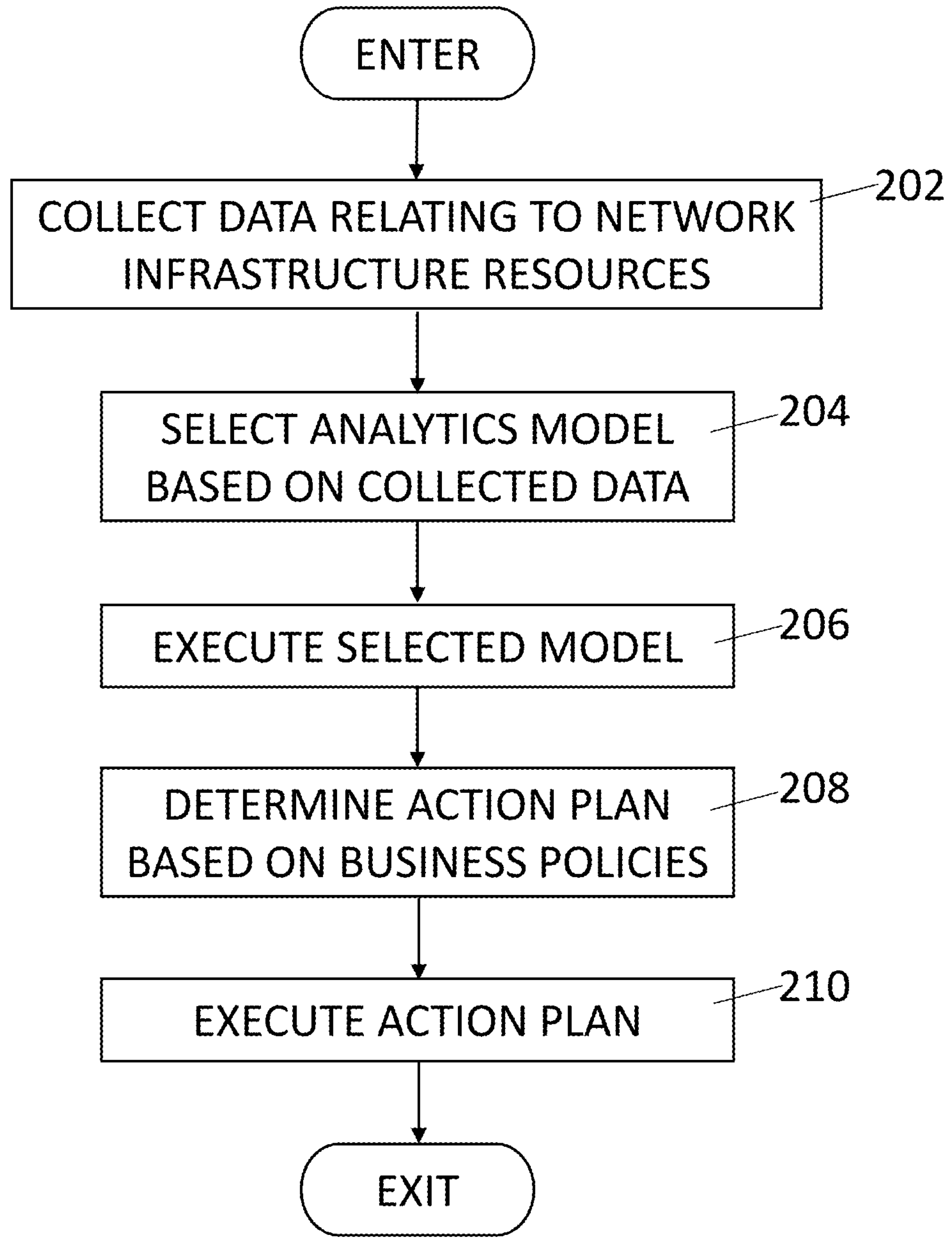
FIG. 4 is an operational flow diagram illustrating one process of collecting garbage resources in an enterprise system in accordance with one aspect of the present disclosure.

Turning now to FIG. 4, a flowchart 200 is provided illustrating an example process for using the enterprise cloud garbage collector 100. Beginning in step 202, the data collector 102 collects data pertaining to network infrastructure resources. Based on the type of information collected, the analytics engine 104 selects, at step 204, an appropriate analytics model for execution. For example, if the collected data only includes resource utilization information, the resource mining model will be selected. If the collected data only includes reference information such as monitoring application or user activities, cloud meta-data or user/system knowledge, the reference mining model will be selected. However, if the collected data includes both resource utilization information as well as reference information, the combined model may be selected. The selected model is executed, at step 206, to return potentially unproductive resources with varying confidence levels The results of step 206 are used to determine, at step 208, an action plan for each confidence level based on business policies of the enterprise. The execution engine 106 executes, at step 210, the determined action plan for an identified resource. Depending upon the goals of the enterprise, the action plan may include notifying the network infrastructure owner or administrator of potentially unproductive resources, decommissioning a resource, reallocating a resource, etc.

Analytics Models

Figure 5:
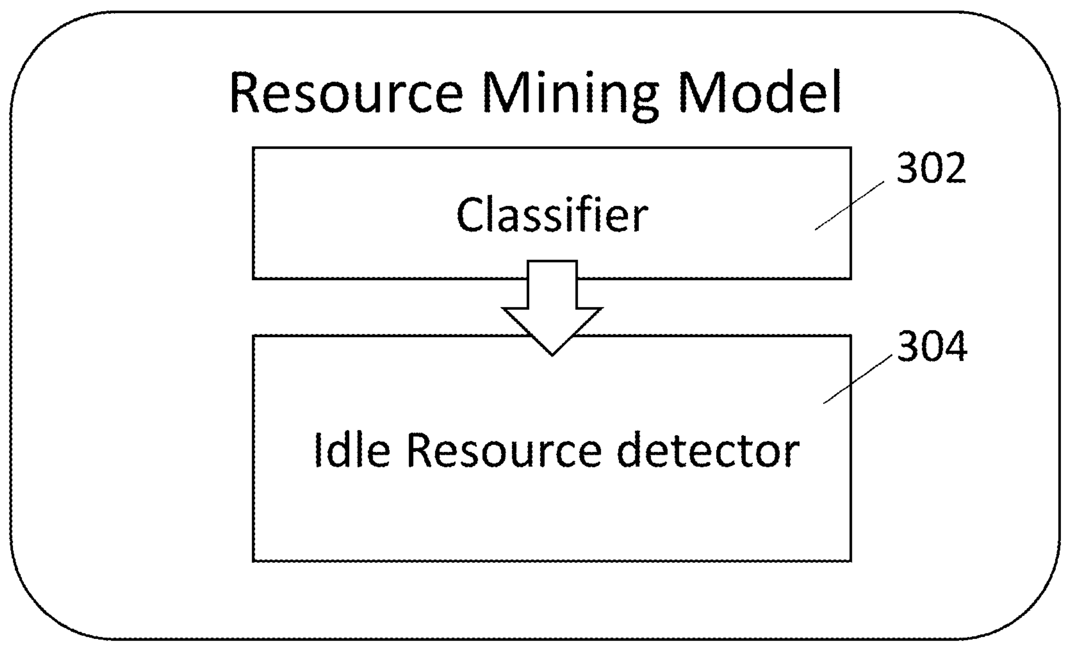
FIG. 5 is a block diagram of a standalone analytics model for use in an analytics engine for providing resource mining according to one embodiment of the present disclosure.
Figure 6:
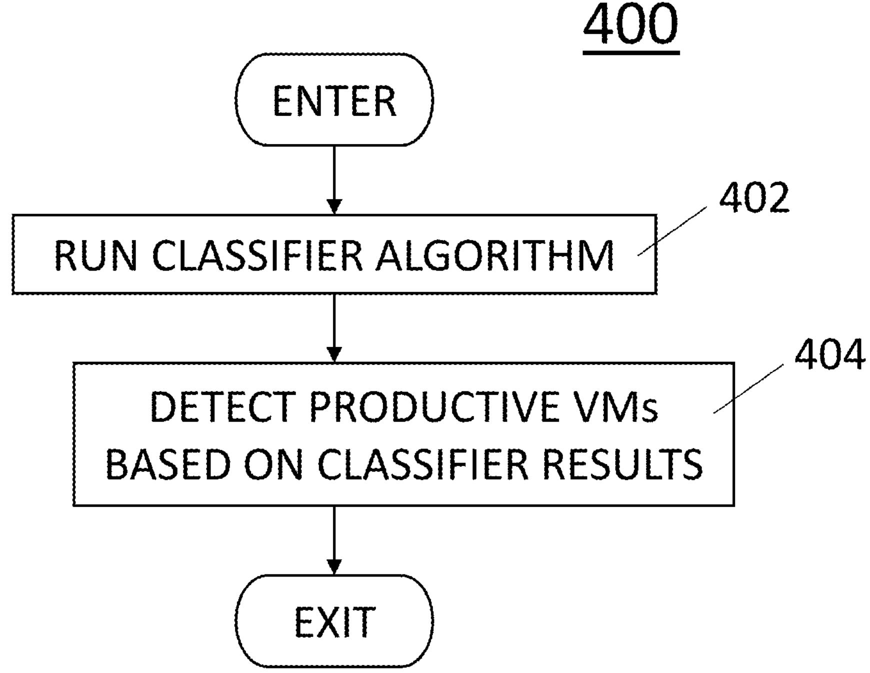
FIG. 6 is an operational flow diagram illustrating a process performed by a resource mining analytics model in accordance with one aspect of the present disclosure.
Figure 7:
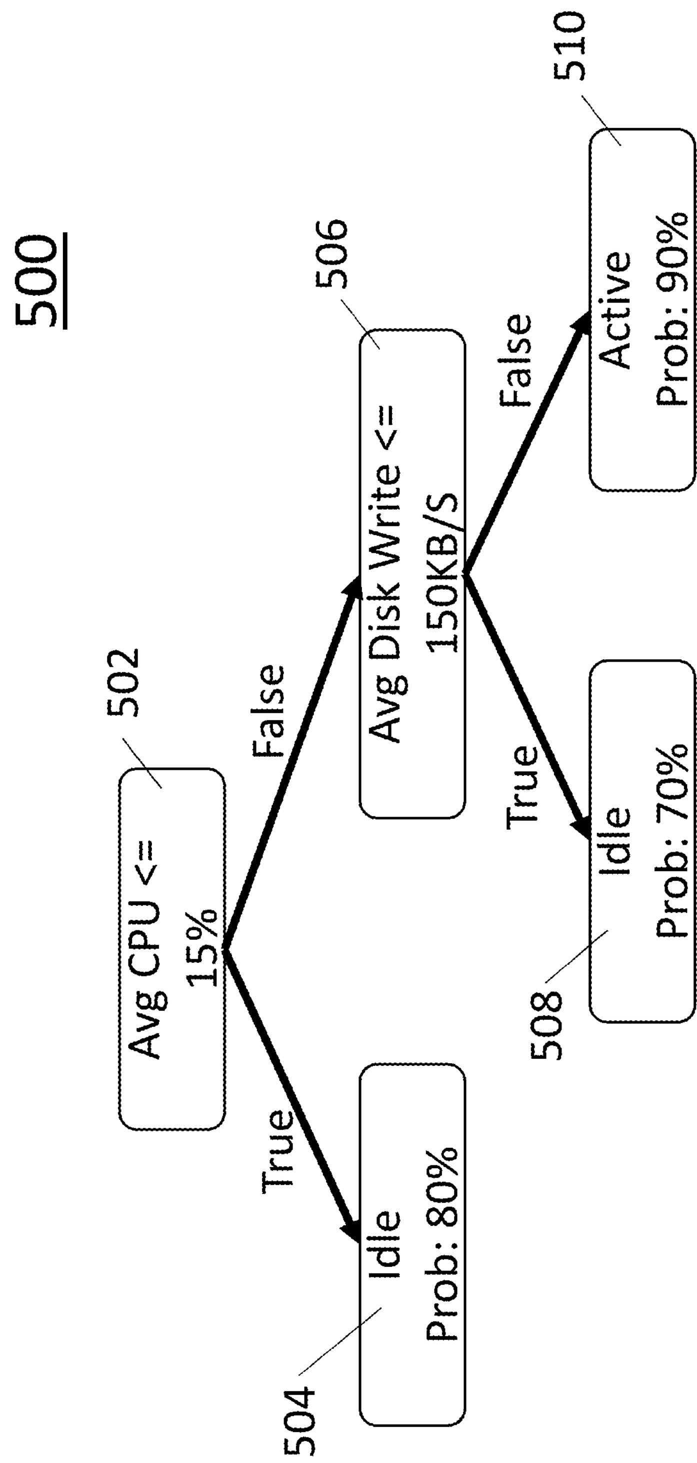
FIG. 7 is a pictorial illustration of an example decision tree classifier used in a resource mining analytics model in accordance with one aspect of the present disclosure.

Turning now to FIGS. 5 and 6, a block diagram of an example resource mining model 300 and a flowchart 400 illustrating an example process performed by the resource mining model 300 are shown. The resource mining model 300 includes a classifier 302 and an unproductive resource detector 304. The classifier 302 runs, at step 402, a classifying algorithm to determine idleness of system resources. Generally, the classifying algorithm, such as a traditional classification and regression tree (CART) algorithm, utilizes a decision tree classifier, such as the example decision tree classifier 500 shown in FIG. 7. The decision tree classifier evaluates certain parameter thresholds to make a simple "true" or "false" decision based on measured metrics. The example decision tree classifier 500 evaluates the probability that a resource is active or idle based on average CPU usage and average disk read/write speed. If the resource's average CPU usage is less than or equal to 15%, at branch 502, the classifier 302 assigns an 80% probability that the resource is idle, at branch 504. However, if the resource's average CPU usage is not less than or equal to 15%, at branch 502, the classifier 302 checks the average read/write speed for the resource, at branch 506. If the average read/write speed is less than or equal to 150 kB/s, the classifier 302 assigns a 70% probability that the resource is idle, at branch 508. If the average read/write speed is not less than or equal to 150 kB/s, at branch 506, the classifier 302 assigns a 90% probability that the resource is active, at branch 510. Although CPU usage and read/write speed are used in the example shown in FIG. 7, it should be noted that the decision classifier tree 500 of FIG. 7 is used only for illustrative purposes and various other parameters, such as network send/receive throughput, may be monitored in addition to or instead of those shown. Using the results of the classifier 302, the unproductive resource detector 304 ultimately decides, at step 404, whether or not a resource is productive or unproductive.

Figure 8:
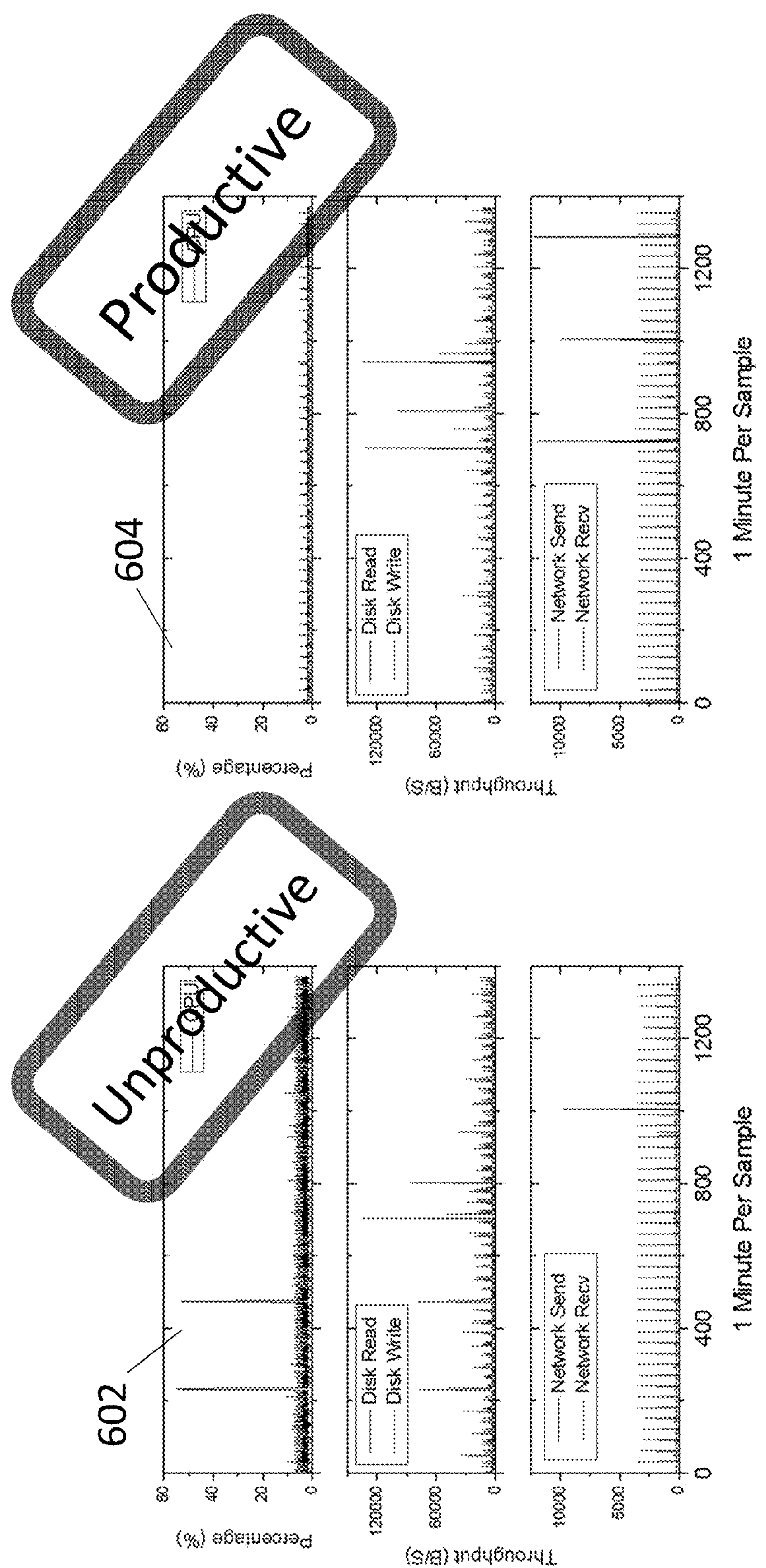
FIG. 8 is a pictorial illustration showing the fallacies of monitoring resource utilization only.

Resource monitoring is a process commonly used today in trying to determine resource status. However, although a correlation between "Resource Idleness" and "Requirement Idleness" may exist, this correlation may not be very reliable, as shown in FIG. 8. Idle resources can look "active" and active resources can look "idle." Resource monitoring data 602 for an unproductive machine may show similar or greater activity than resource monitoring data 604 for a productive machine. On an unproductive machine, various activities such as a scheduled virus scan, disk defragmentation, system update or other background services may cause the machine to appear active. Even worse, the machine could be running applications that are not actually needed by users as no machine ever actually uses the results. Likewise, productive machines may appear idle at a given moment due to activities such as users doing lightweight text editing or the machine being used as a failover machine which is idle most of the time, but required to be available at any time for disaster recovery or backup purposes. Additionally, although a resource may show temporary idleness, the resource may be needed in the future.

Figure 9:
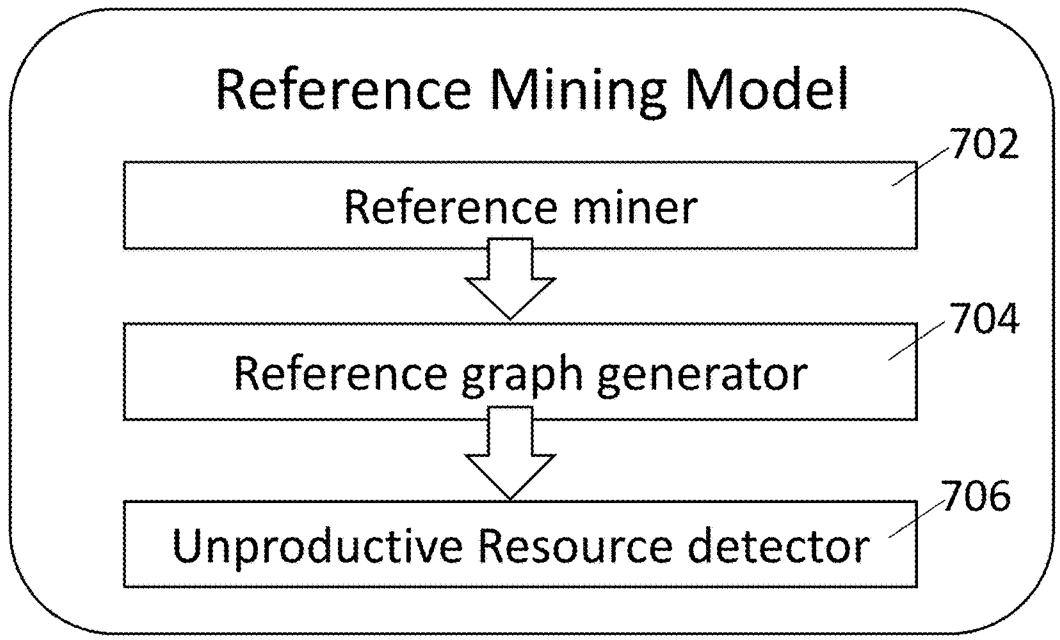
FIG. 9 is a block diagram of a standalone analytics model for use in an analytics engine for providing reference mining according to one embodiment of the present disclosure.
Figure 10:
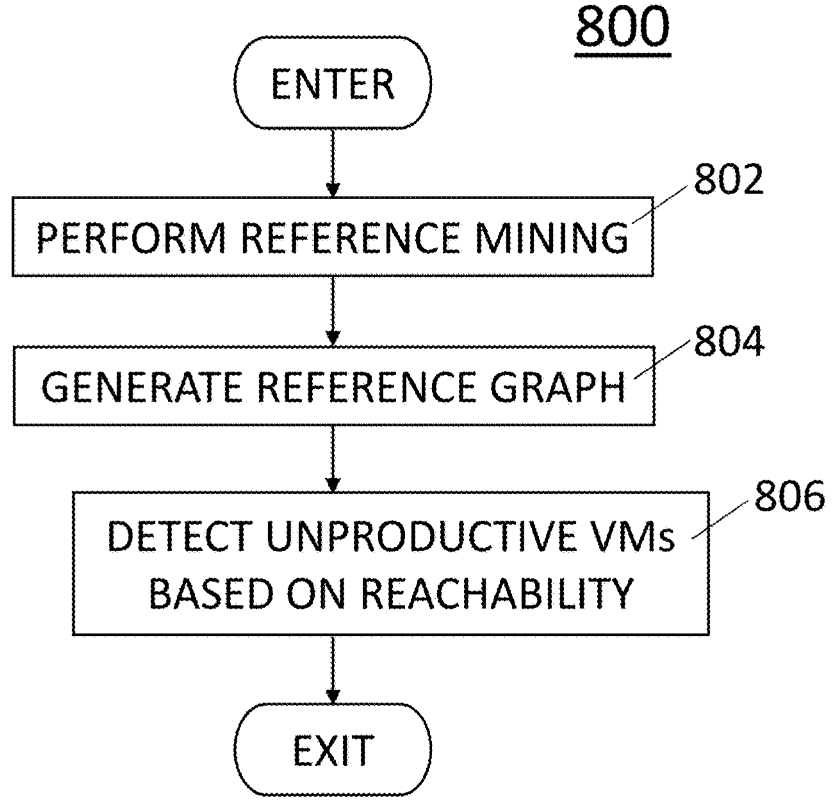
FIG. 10 is an operational flow diagram illustrating a process performed by a reference mining analytics model in accordance with one aspect of the present disclosure.

Referring now to FIGS. 9 and 10, a block diagram of an example reference mining model 700 and a flowchart 800 illustrating an example process performed by the reference mining model 700 are shown. Reference mining is the process of deriving a set of edges within a reference graph, similar to a node diagram, that denote a relationship between a user and a system or the system and another system. The reference mining model 700 includes a reference miner 702, a reference graph generator 704 and an unproductive resource detector 706. The goal of the reference miner 702 is to identify unproductive resources, including VMs, in the network infrastructure 108 and provide a confidence level for the identification. The reference miner 702 receives, at step 802, reference data from the data collector 102 including application and user behavior (e.g., user logins and terminal activity), cloud meta-data (e.g., load balancer, auto-scaling group), resource dependency discovery (e.g., network connections, configuration files, log files) and user/system knowledge.

Figure 11:
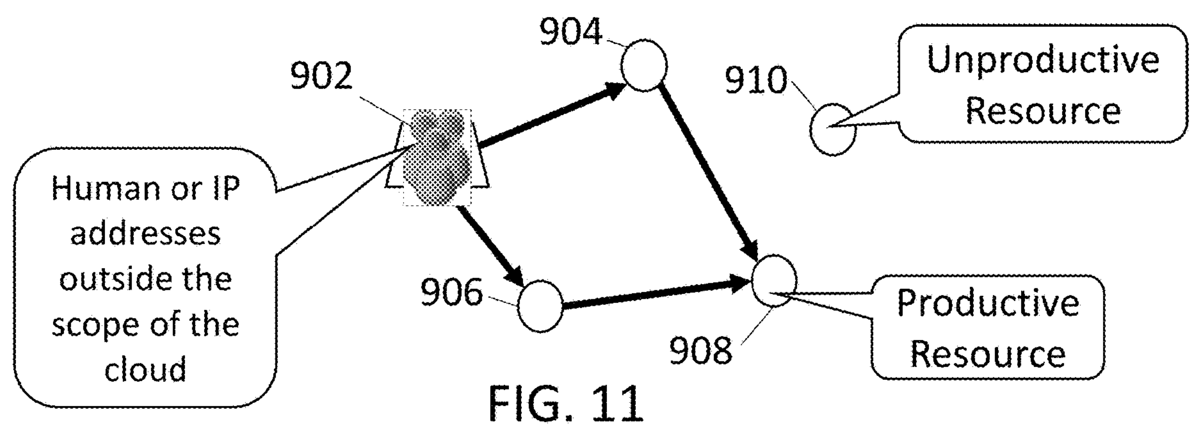
FIG. 11 is a pictorial illustration analogizing cloud garbage collection to traditional memory garbage collection.

Going on the assumption that if a resource is in productive use, the resource is either used or referenced directly by the user (i.e. an end user or other client device or application), or it is actively used by another client (e.g., another VM) that is in productive use, the reference graph generator 704 generates, at step 804, a reference graph showing the relationship of all the resources in the cloud 108. The reference graph 900, shown in FIG. 11, is analogous to traditional garbage collection tools used in memory management processes. The cloud provider monitors all the resources in the cloud 108 as users and devices connect to the cloud from all sides (e.g., someone using a machine or a web service is hosting web pages). The reference graph generator 804 checks how resources talk to each other and who talks to the resource from outside the universe of the cloud. The reference graph 900 indicates a consumer's 902 (such as an end user or client device/process) relationship to the resources in the cloud 108. Resources 904 and 906 are productive resources (such as an application server) which have direct connectivity with the consumer. Resource 908 is a productive resource (such as a database) that is used by other resources 904, 906 but has no direct connection with the consumer. Resource 910 is an unproductive resource as no one outside or inside the network infrastructure 102 ever communicates directly with resource 910.

A set of rules define the reference relationships and are characterized by a degree of confidence. One example set of rules is shown in Table 1. The system is also extendible to allow the addition of domain specific rules.

TABLE 1

| Rule | Description | Unproductive (0) | Low Productivity (1) | Medium Productivity (2) | High Productivity (3) |
|---|---|---|---|---|---|
| User Remote Connection | User established a remote connection to the server | >7 days | 7 days | 3 days | 1 day |
| User Commands | Set of commands issued by a logged in user | Read-only commands (i.e. ls, more, cat) | Commands unlikely to be related to productive work (installing updates) | Commands likely to be related to productive work (interacting with productive applications) | Commands clearly associated with productive work (starting services, modifying configuration) |
| User Activity | Number of users connected to a server | No users | 1 user | 2 users | >2 users |
| Web Server Traffic | Web server serving requests for pages | No traffic in >7 days | Traffic in the last 7 days | Traffic in the last 3 days | Traffic in the last day |
| Database Traffic | Database activity | No traffic in >7 days | Read/write traffic in the last 7 days | Read/write traffic in the last 3 days | Write traffic in the last day |
| Disaster Recovery | Server serves as a DR server to another server | N/A | N/A | N/A | Server is a DR server |
| Auto-scaling | Server is in auto-scaling group with another server | N/A | N/A | N/A | Server is an AS server |

Figure 12:
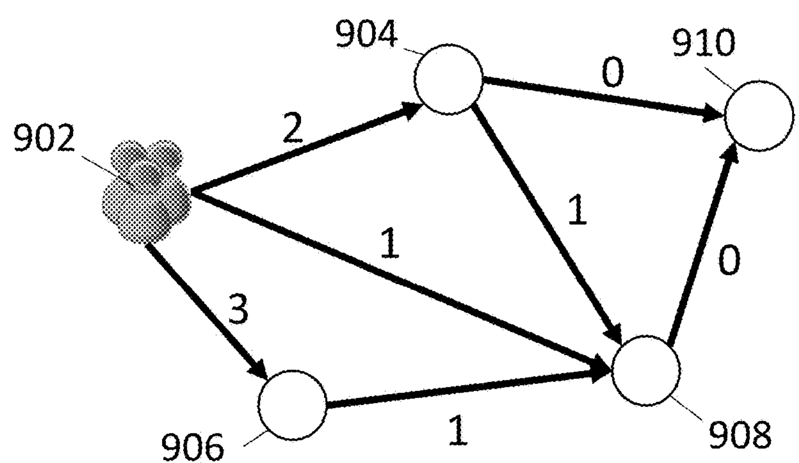
FIGS. 12 through 16 are sequential illustrations illustrating calculating confidence levels for identifying unproductive virtual machines in the cloud according to an aspect of the present disclosure.

The reference graph generator 704 executes all the rules to determine a weight for each edge of the reference graph 1000, as shown in FIG. 12. A "0" weight indicates an unproductive resource, a "1" weight indicates a productive resource with a low confidence level. A "2" weight indicates a productive resource with a medium confidence level. A "3" weight indicates a productive resource with a high confidence level. The reference graph generator 704 selects the highest confidence assigned using the rule set.

Figure 13:
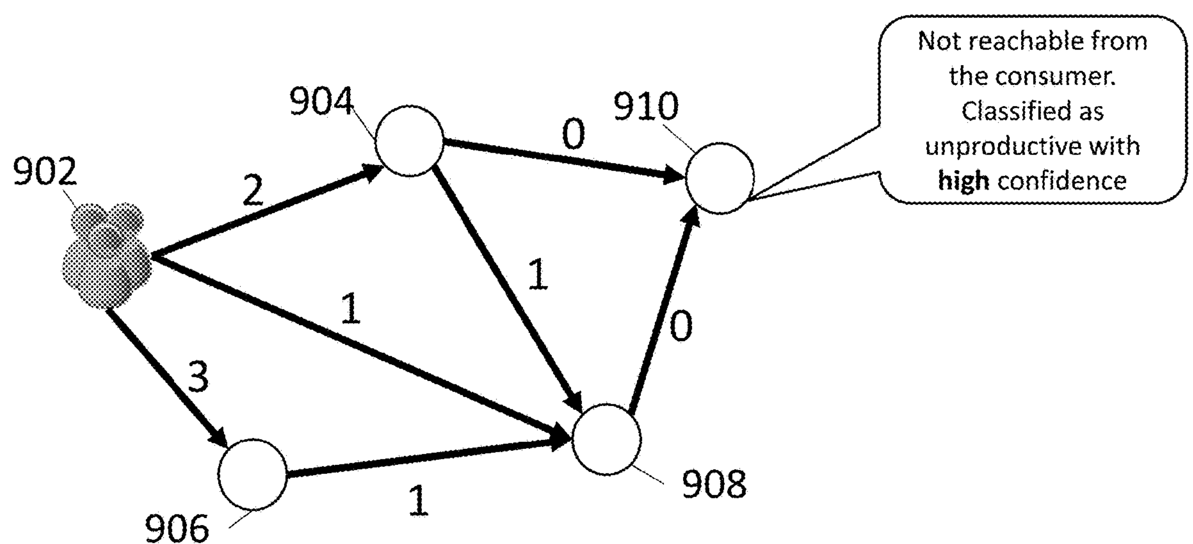
Figure 14:
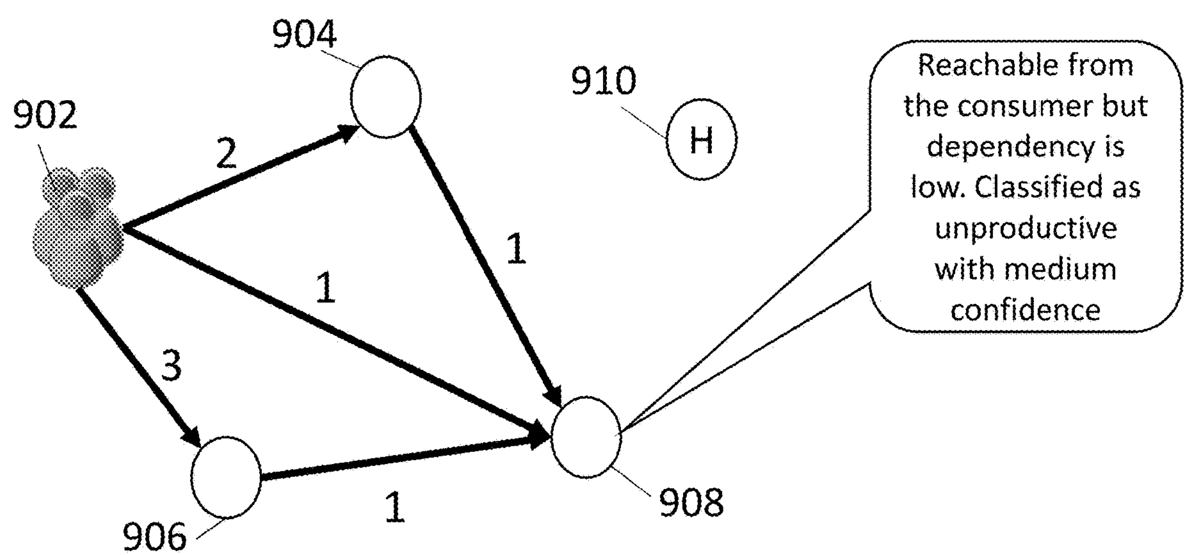
Figure 15:
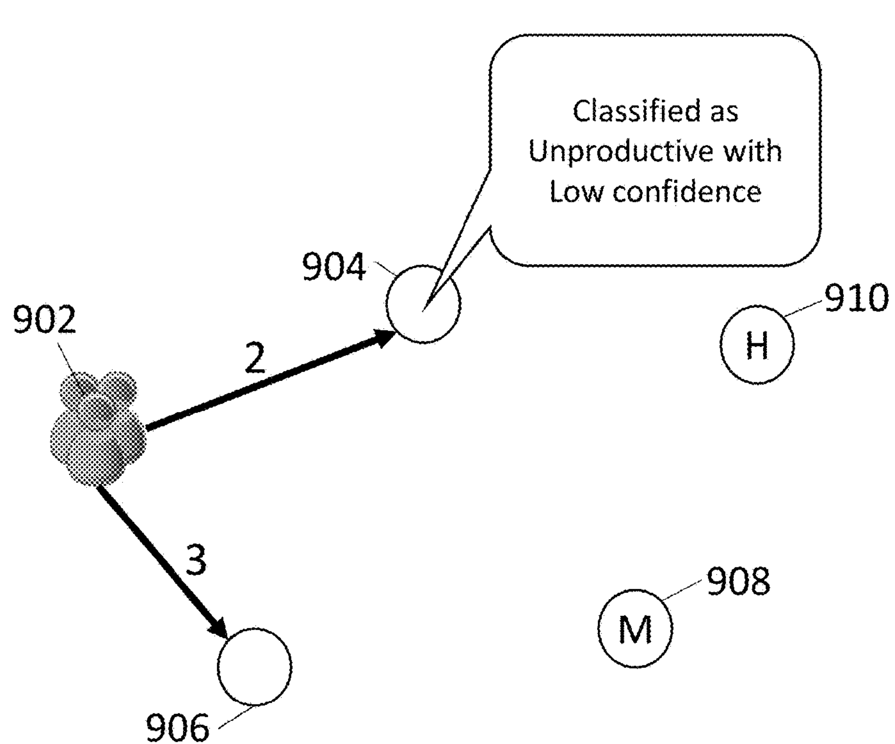
Figure 16:
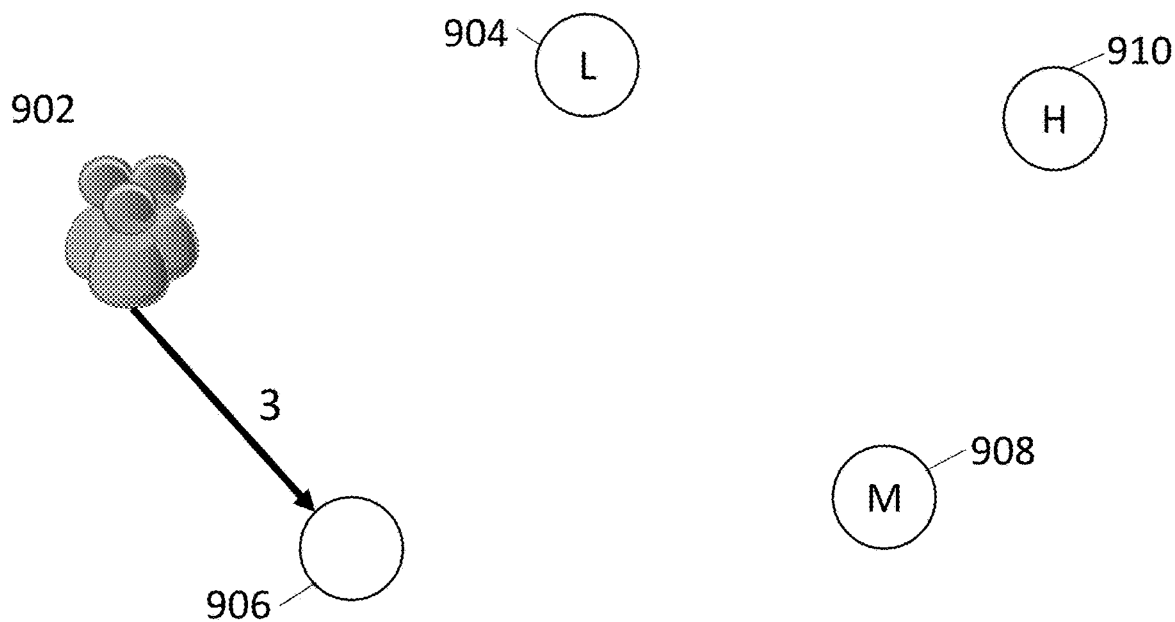

The reference graph generator 704 filters out resources containing only "0" weight edges, as shown by reference graph 1100 in FIG. 13. As resource 910 is not reachable from the consumer and contains only "0" weight edges, resource 910 is classified as unproductive with high confidence. The reference graph generator 704 proceeds to filter out resources containing at least one "1" weight edge, as shown by reference graph 1200 in FIG. 14. Since resource 908 contains only "1" weight edges, resource 908 is classified as unproductive with medium confidence. The reference graph generator 704 filters out resources containing at least one "2" weight edge, as shown by reference graph 1300 in FIG. 15. As resource 904 contains a "2" weight edge, resource 904 is classified as unproductive with low confidence. Any remaining resources having at least one "3" weight edge is considered productive with high confidence, as shown by resource 906 in reference graph 1400 of FIG. 16.

Figure 17:
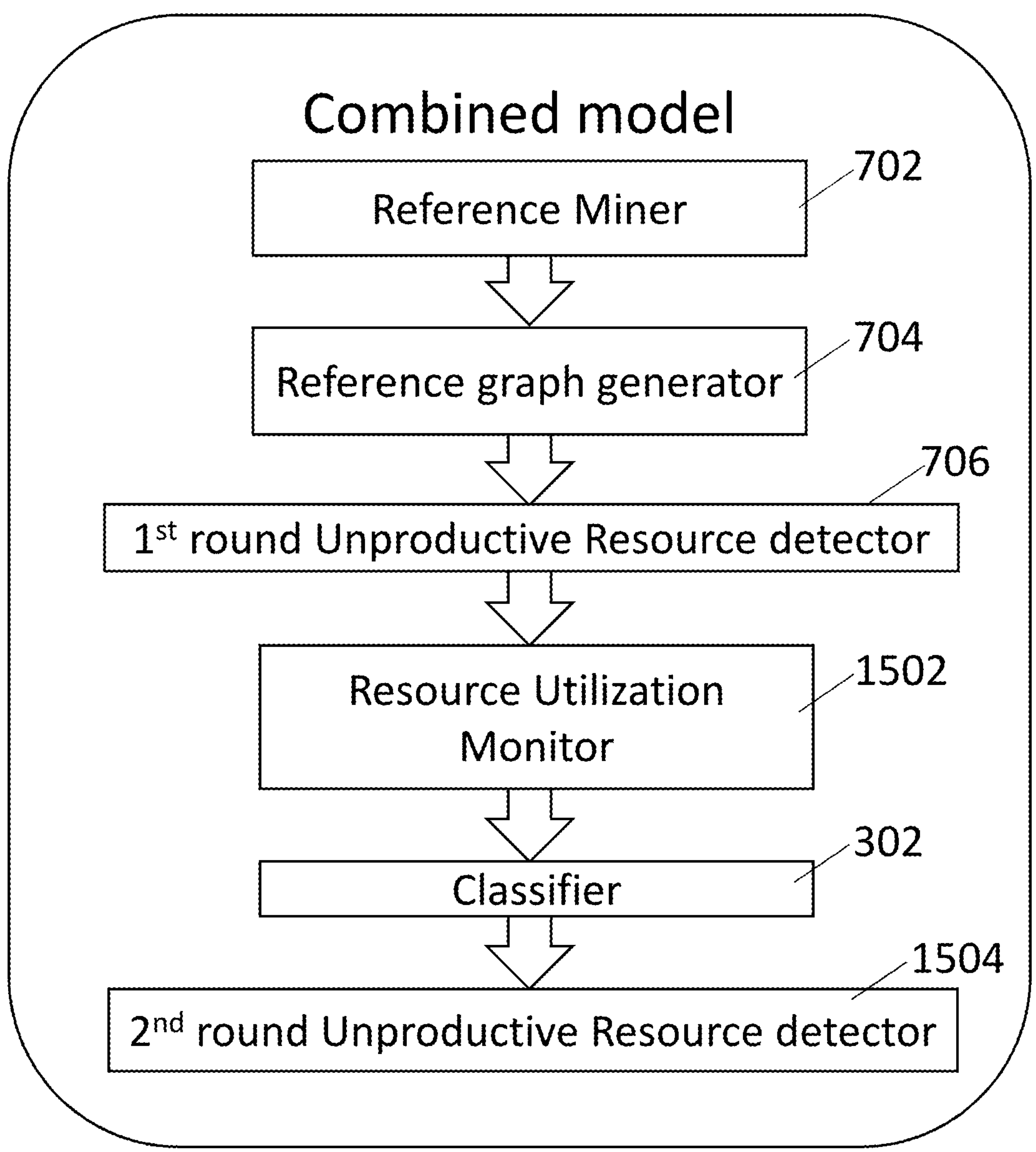
FIG. 17 is a block diagram of a combined analytics model for use in an analytics engine for providing reference and resource mining according to one embodiment of the present disclosure.
Figure 18:
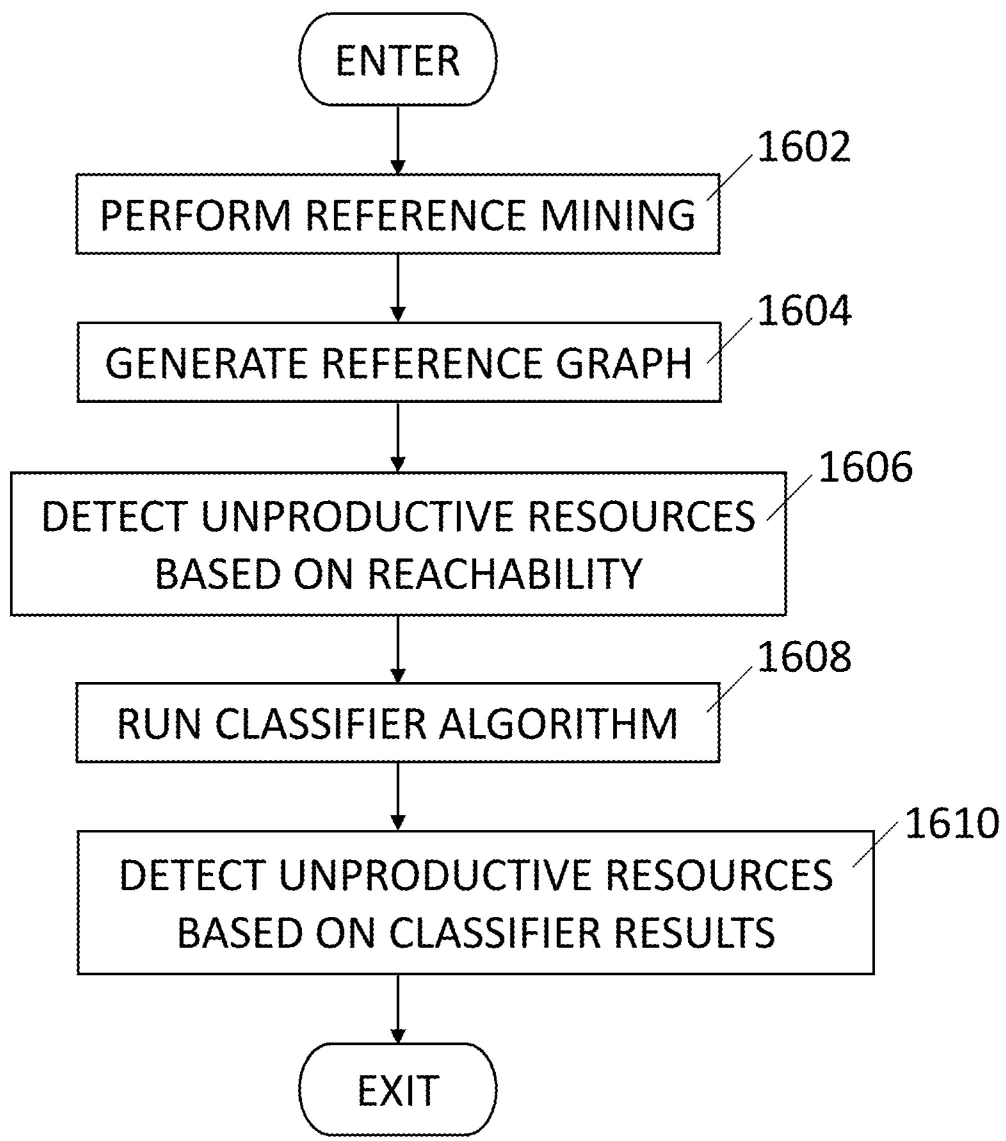
FIG. 18 is an operational flow diagram illustrating a process performed by a combined mining analytics model in accordance with one aspect of the present disclosure.

Referring now to FIGS. 17 and 18, a block diagram of an example combined mining model 1500 and a flowchart 1600 illustrating an example process performed by the combined mining model 1500 are shown. The combined mining model 1500 includes a reference miner 702, a reference graph generator 704 and a first round unproductive resource detector 706, as described above in reference to reference mining model 700. The reference miner 702 performs reference mining, at step 1602, to deliver information to the reference graph generator 704 which generates a reference graph, at step 1604. The first round unproductive resource detector 706 detects unproductive resources according to reachability, at step 1606, as described above in relation to the reference mining model 700.

In addition, the combined mining model 1500 includes a resource utilization monitor 1502 which delivers resource utilization information to a classifier 302 running a classifier algorithm, at step 1608, as described above in relation to resource mining model 300. The combined mining model 1500 also includes a second round unproductive resource detector 1504 which detects unproductive resources, at step 1610, based on the classifier 302 results. The second round unproductive resource detector 1504 operates slightly differently than its counterpart unproductive resource detector 304 of resource mining model 300. The second round unproductive resource detector 1504 also takes into consideration the results of the reference mining process. Thus, if the reference mining determines that a resource is productive, the second round unproductive resource detector 1504 will ignore the results from the classifier 302 even if the classifier 302 had determined that the resource was idle. Additionally, the results of the classifier 302 may be used to enhance the results from the reference mining process. For example, if reference mining decides that a resource is unproductive and the classifier 302 predicts "Active" with more than a certain probability level (e.g., greater than 80%), the second round unproductive resource detector 1504 may downgrade the confidence level of the resource. Likewise, if reference mining decides that a resource is unproductive and the classifier 302 predicts "Idle" with more than a certain probability level (e.g., 80%), the second round unproductive resource detector 1504 may upgrade the confidence level of the resource.

Information Processing System

Figure 19:
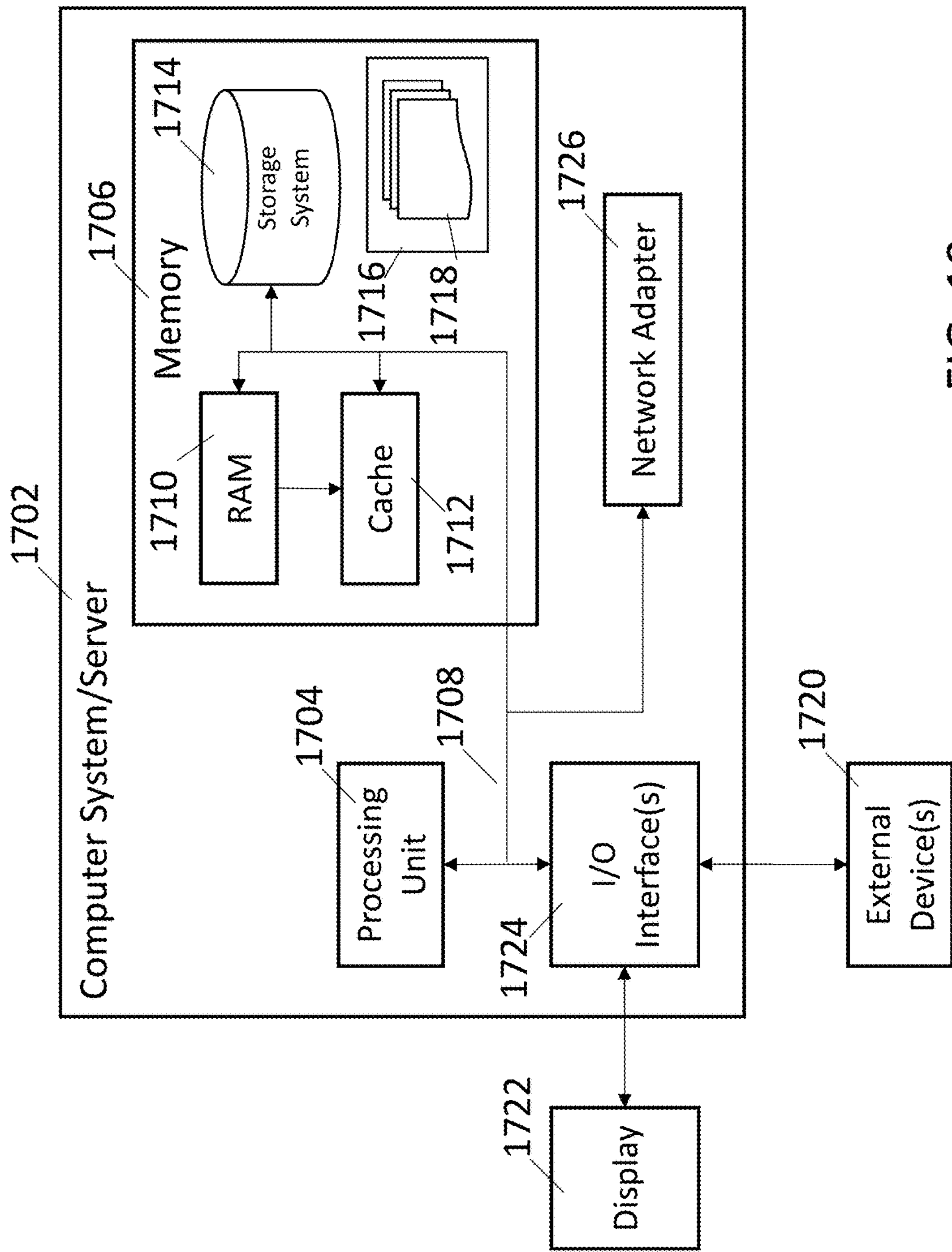
FIG. 19 is a block diagram illustrating one example of an information processing system according to one embodiment of the present disclosure.

Referring now to FIG. 19, this figure is a block diagram illustrating an information processing system 1700 that can be utilized in embodiments of the present disclosure. The information processing system 1702 is based upon a suitably configured processing system configured to implement one or more embodiments of the present disclosure (e.g., enterprise garbage collector 100). Any suitably configured processing system can be used as the information processing system 1702 in embodiments of the present disclosure. The components of the information processing system 1702 can include, but are not limited to, one or more processors or processing units 1704, a system memory 1706, and a bus 1708 that couples various system components including the system memory 1706 to the processor 1704.

The bus 1708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 19, the main memory 1706 may include the data collector 102, the analytics engine 104, and the execution engine 106 shown in FIG. 3, as well as the resource mining model 300, the reference mining model 700 and the combined mining model 1500. One or more of these components 102, 104, 106, 300, 700, 1500 can reside within the processor 1704, or be a separate hardware component. The system memory 1706 can also include computer system readable media in the form of volatile memory, such as random access memory (RAM) 1710 and/or cache memory 1712. The information processing system 1702 can further include other removable/non-removable, volatile/non-volatile computer system storage media. By way of example only, a storage system 1714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1708 by one or more data media interfaces. The memory 1706 can include at least one program product having a set of program modules that are configured to carry out the functions of an embodiment of the present disclosure.

Program/utility 1716, having a set of program modules 1718, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 1718 generally carry out the functions and/or methodologies of embodiments of the present disclosure.

The information processing system 1702 can also communicate with one or more external devices 1720 such as a keyboard, a pointing device, a display 1722, etc.; one or more devices that enable a user to interact with the information processing system 1702; and/or any devices (e.g., network card, modem, etc.) that enable computer system/server 1702 to communicate with one or more other computing devices. Such communication can occur via I/O interfaces 1724. Still yet, the information processing system 1702 can communicate with one or more networks such as a local area network (LAN), a general wide area network (WAN), and/or a public network (e.g., the Internet) via network adapter 1726. As depicted, the network adapter 1726 communicates with the other components of information processing system 1702 via the bus 1708. Other hardware and/or software components can also be used in conjunction with the information processing system 1702. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit"," "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for collecting unproductive resources in a network infrastructure, the method comprising:

- collecting data relating to resources of a network infrastructure;
- selecting an analytics model based on a type of the collected data;
- executing the selected analytics model to classify a resource as one of unproductive and productive and to assign a corresponding confidence level;
- determining an action plan for each confidence level; and
- executing the action plan for the resource.

2. The method of claim 1, wherein the collected data comprises at least one of resource utilization information, hypervisor information, cloud related meta-data, user knowledge and system knowledge.

3. The method of claim 1, wherein the data type comprises only resource data, the selected analytics model is a resource mining model.

4. The method of claim 1, wherein the data type comprises reference data, the selected analytics model is a reference mining model.

5. The method of claim 4, wherein the reference mining model:

generates a reference graph of resources within the network infrastructure;

assigns a weight to each edge of the reference graph based on a set of heuristic rules; and determines the confidence level for each resource based on reachability.

6. The method of claim 1, wherein the data type comprises reference data and resource data, the selected analytics model is a combined mining model.

7. The method of claim 6, wherein the combined mining model:

generates a reference graph of resources within the network infrastructure;

assigns a weight to each edge of the reference graph based on a set of heuristic rules;

classifies each resource as one of unproductive and productive with a corresponding confidence level for each resource based on reachability;

reclassifies each resource as one of unproductive and productive with a corresponding probability level based on resource utilization; and modifies the confidence level based on the reclassification and corresponding probability level.

8. The method of claim 7, wherein a resource is originally classified as productive, the method further comprises ignoring the reclassification.

9. The method of claim 7, wherein a resource is originally classified as unproductive the method further comprises downgrading the confidence level when the resource is reclassified as productive.

10. The method of claim 7, wherein a resource is originally classified as unproductive the method further comprises upgrading the confidence level when the reclassifying affirms that the resource is classified as unproductive.

11. The method of claim 1, wherein the action plan includes at least one of: notifying a user that a resource is unproductive, suspending the resource, decommissioning the resource and reallocating the resource.

12. An information processing system for collecting unproductive resources in a network infrastructure, the information processing system comprising a memory;

a processor operably coupled to the memory; and an enterprise garbage collector operably coupled to the memory and the processor, the enterprise garbage collector configured to perform a method comprising:

collecting data relating to resources of a network infrastructure;

selecting an analytics model based on a type of the collected data;

executing the selected analytics model to classify a resource as one of unproductive and productive and to assign a corresponding confidence level;

determining an action plan for each confidence level; and executing the action plan for the resource.

13. The information processing system of claim 12, wherein the collected data comprises at least one of resource utilization information, hypervisor information, cloud related meta-data, user knowledge and system knowledge.

14. The information processing system of claim 12, wherein the data type comprises reference data, the selected analytics model is a reference mining model.

15. The information processing system of claim 14, wherein the reference mining model:

generates a reference graph of resources within the network infrastructure;

assigns a weight to each edge of the reference graph based on a set of heuristic rules; and determines the confidence level for each resource based on reachability.

16. The information processing system of claim 12, wherein the data type comprises reference data and resource data, the selected analytics model is a combined mining model.

17. The information processing system of claim 16, wherein the combined mining model:

generates a reference graph of resources within the network infrastructure;

assigns a weight to each edge of the reference graph based on a set of heuristic rules;

classifies each resource as one of unproductive and productive with a corresponding confidence level for each resource based on reachability;

reclassifies each resource as one of unproductive and productive with a corresponding probability level based on resource utilization; and modifies the confidence level based on the reclassification and corresponding probability level.

18. The information processing system of claim 17, wherein a resource is originally classified as productive, the method further comprises ignoring the reclassification.

19. The information processing system of claim 17, wherein a resource is originally classified as unproductive the method further comprises downgrading the confidence level when the resource is reclassified as productive.

20. A computer program product for collecting unproductive resources in a network infrastructure, the computer program product comprising:

a storage medium readable by a processing circuit and storing instructions for execution by the processing circuit for performing a method comprising:

collecting data relating to resources of a network infrastructure;

selecting an analytics model based on a type of the collected data;

executing the selected analytics model to classify a resource as one of unproductive and productive and to assign a corresponding confidence level;

determining an action plan for each confidence level; and executing the action plan for the resource.

* * * * *